(No Model.) 2 Sheets—Sheet 1.

G. E. DORMAN.
DYNAMO ELECTRIC MACHINE.

No. 570,914. Patented Nov. 10, 1896.

Witnesses.

Inventor.
George Edward Dorman (No Model.) 2 Sheets—Sheet 2.
G. E. DORMAN.
DYNAMO ELECTRIC MACHINE.
No. 570,914. Patented Nov. 10, 1896.
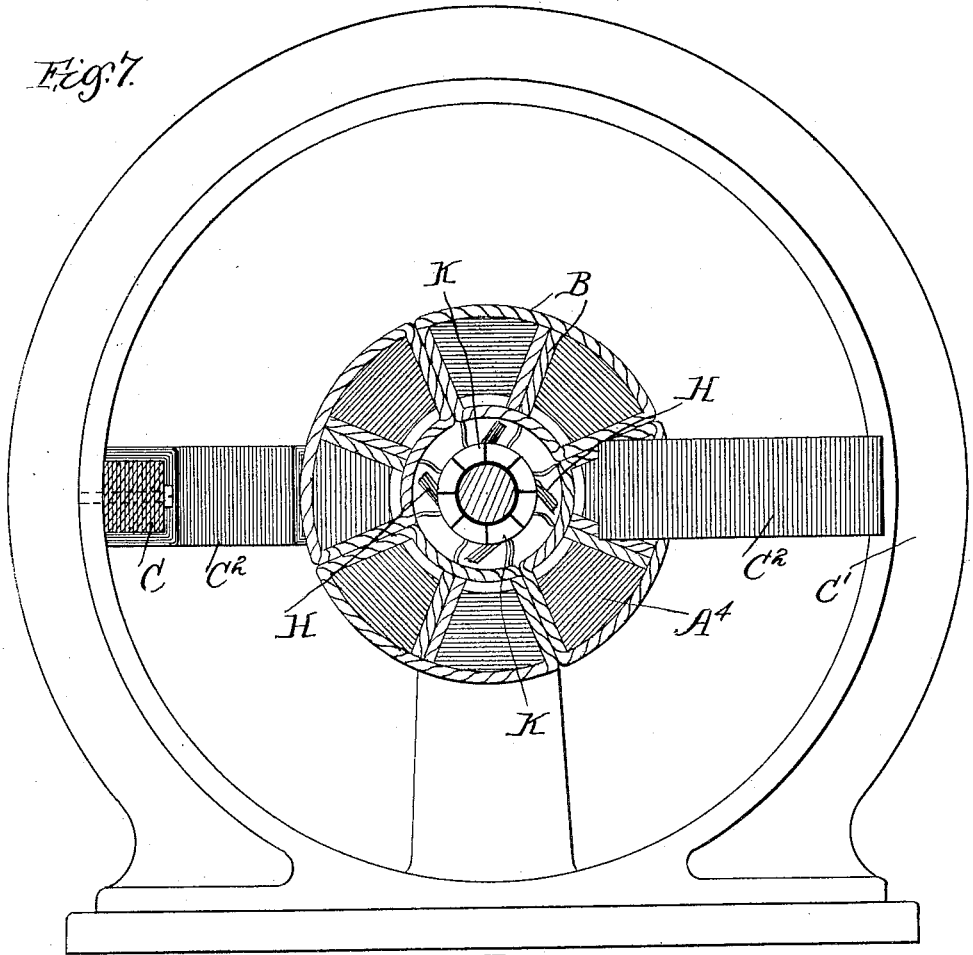
Fig. 7.
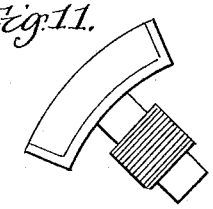
Fig. 11.
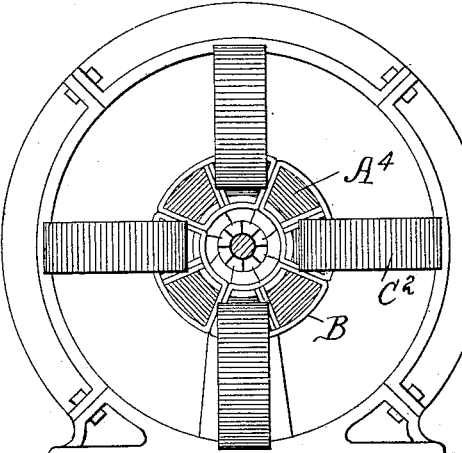
Fig. 8.
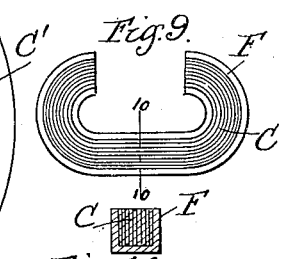
Fig. 9.
Fig. 10.
Witnesses.
Wm. M. Rheem.
Wm. J. Henning.
Inventor.
George Edmin Dorman

UNITED STATES PATENT OFFICE.

GEORGE EDENSOR DORMAN, OF CHICAGO, ILLINOIS, ASSIGNOR TO JOHN EHRENFRIED DORMAN, OF SAME PLACE.

DYNAMO-ELECTRIC MACHINE.

SPECIFICATION forming part of Letters Patent No. 570,914, dated November 10, 1896.

Application filed February 4, 1896. Serial No. 578,069. (No model.)

*To all whom it may concern:*

Be it known that I, GEORGE EDENSOR DORMAN, a subject of the Queen of Great Britain, residing at Chicago, in the county of Cook and State of Illinois, have invented certain Improvements in Dynamo-Electric Machines, of which the following is a specification.

My invention relates to dynamo-electric machines, and has for its object to provide a new and improved dynamo-electric machine, of which the following is a description, reference being had to the accompanying drawings, wherein—

Figure 1:
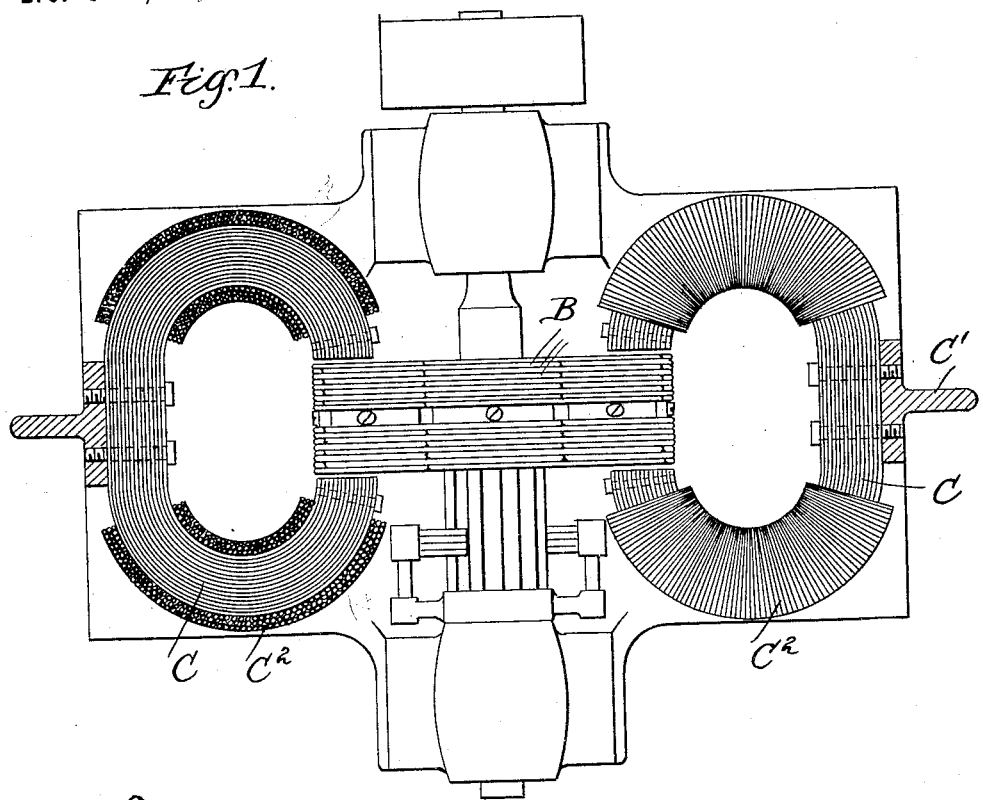
Figure 2:
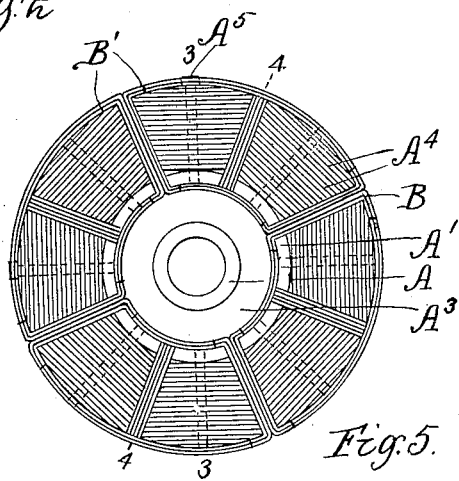
Figure 3:
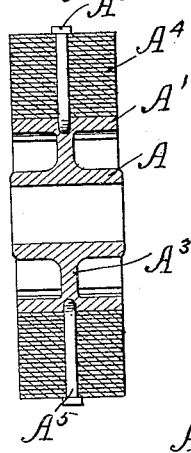
Figure 4:
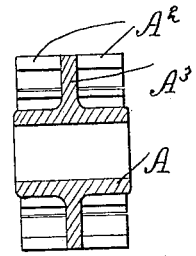
Figure 5:
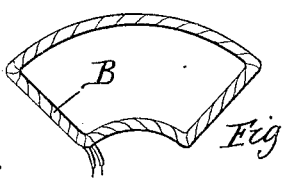
Figure 6:
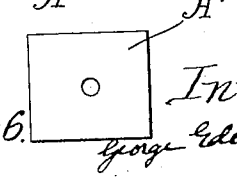

Figure 1 is a plan view of a dynamo-electric machine embodying my invention. Fig. 2 is a side view of the armature. Fig. 3 is a section on line 3 3, Fig. 2. Fig. 4 is a section through the hub or spider of the armature. Fig. 5 is an enlarged view of one of the armature-coils. Fig. 6 is an enlarged view of one of the plates of which the armature-core is composed. Fig. 7 is a side view of my machine with parts broken away. Fig. 8 is a side elevation of a modified form of my device. Fig. 9 is a plan view of a modified form of field-magnet core. Fig. 10 is a cross-section on line 10 10, Fig. 9. Fig. 11 is a view of a portion of the frame when made in sections, having a field-coil connected therewith.

Like letters refer to like parts throughout the several figures.

The armature of my machine consists of a cast-iron, steel, or wrought-iron wheel or spider A, with a central hub and spokes or solid flange or disk. The rim A' overhangs the hub on either side. The rim A' is provided at intervals with slots $A^2 A^2$, said slots extending preferably up to the flange or spokes $A^3$. Said slots may be opposite one another or may be made so as to break joints. To the periphery of this wheel is attached a number of insulated sheet-iron strips $A^4 A^4$. These strips may be attached to the wheel in any desirable manner—as, for example, by means of the insulated bolts $A^5 A^5$. These sheet-iron strips are preferably connected with the rim A' so that there will be a series of projecting arms or parts separated by slots or openings for the admission of the coils to be placed upon the armature, as shown, for example, in Fig. 2.

Instead of having a series of projecting arms or parts each composed of a number of plates, as shown in Fig. 2, I may connect continuous bands of sheet metal to the periphery of the wheel and have the slots or openings for the coils made afterward by means of a slotting-machine. In this case the slots may break joints on each side.

The coils of wire B to be placed upon the armature may be of any desired size and are wound beforehand and inserted in the openings in the core of the armature, as shown in Fig. 2. These coils are simply slipped into position in these slots and are held there by any convenient means—as, for example, by the binding wires, string, or tape B' B', those binding-wires below passing through holes in the flange or between the spokes and being between the coils and the core. The armature-coils when in position embrace few or many of the slots, as desired.

As shown in the drawings, the coils are of such size as to embrace one slot. The coils are placed in position one above the other until one side of the core is filled or there is a radial portion of a coil in each slot. These wires or coils are then bound together and held in position in any suitable manner. The other side of the armature is filled with coils in the same manner. These coils are wound and may be taped or insulated before being placed upon the armature-core. The shaft of the armature may be provided with two commutators, one on each side of the hub, the coils being connected on the Gramme system, those on one side of the armature being connected with one commutator and those on the other being connected with the opposite commutator. This arrangement forms two separate machines, or a direct-current transformer, as is well understood. As shown in the drawings, all of the coils are connected to one commutator, the connecting-wires passing through holes in the flange or between the spokes. The coils are segmental or oblong. The field-magnets C are built up of the strips of insulated sheet-iron bent and bolted to a frame C', attached to the machine. The field-coils $C^2$ are wound beforehand and slipped upon the cores C. The two ends of each of the field-magnets approach each other, the armature being revolved between such ends, as shown in Fig. 1. Any desired number of these magnets may be used, two being used for a bipolar machine and several for a multipolar machine.

The frame of the machine may be made in one casting or may be constructed in several parts or segments, as shown in Fig. 8, said segments being bolted together in any convenient manner. This construction allows the machine to be easily and quickly taken to pieces for repairing or the like. Instead of having the field-coils consist simply of sheet-iron strips attached to the frame of the machine I may provide a cast-iron trough F of the required shape, the sheet-iron strips C being placed therein, as shown in Figs. 9 and 10. I may energize the field-magnets in such a manner that the poles on one side of the armature will all be of similar polarity or of different polarities, as desired.

By constructing a dynamo as herein described I obtain a reduction in the weight of copper employed and have a construction of armature which allows the coils to be wound upon a lathe or other device and inserted in position after winding. These coils may be easily taken out and replaced in case it should become necessary to do so.

In order to avoid sparking, the section of the fields with relation to the armature-coils, more especially at the poles, should be such that when each coil is in a central position with regard to the pole the said pole shall be well within the area of the coil. This is especially necessary when the line of commutation is in the plane of the fields or of the lines of force, as shown at H, Fig. 7, such line of commutation resulting from the polarity of the fields being respectively north and south on one side and south and north on the other side of the armature, but when the polarity of the fields is the same on each side of the said armature the line of commutation will be at right angles to the plane of the lines of force, as at K, Fig. 7, when the section of the fields is not so important. In the drawings shown the section of the fields is much smaller than the area of the coils, and I do not bind myself to this form of field, as any field as usually applied to disk machines may be used, but the laminated iron here shown is extremely desirable.

I have described these several parts in detail, but it is evident that they may be varied in form, construction, and arrangement without departing from the spirit of my invention, and I therefore do not wish to be limited to the construction shown.

I claim—

1. An armature comprising a wheel having a rim and a central hub joined together by spokes or a solid flange, said rim overhanging the hub and being provided with slots which extend from the edges to the spokes or flange, a series of projecting parts or arms of laminated iron fastened to said rim and separated by spaces or slots which register with the slots in said rim, said projecting arms each composed of a series of insulated plates of iron or lamination, substantially as described.

2. An armature for dynamo-electric machines comprising a wheel having a central hub and an outer rim, said hub and rim joined together by spokes or a solid flange, said rim overhanging the hub and being provided with a number of slots and a series of projecting arms or parts connected with said rim and consisting of a series of strips of sheet-iron or the like, said arms or parts being separated by slots which register with the slots in the flange of the wheel, and a series of coils adapted to be placed in these slots so as to encircle or embrace one or more of said projecting arms or parts substantially as described.

3. A field-magnet for a dynamo-electric machine comprising a core made up of a series of elliptically-bent strips of iron, an iron trough into which said strips are placed and which holds them in position said strips of iron being cut away at one point so as to provide an opening in which the armature rotates, one or more coils of wire adapted to be slipped over the ends of said plates, said strips bolted to a cast-iron, steel, or wrought-iron frame forming part of the frame of the machine.

4. A dynamo-electric machine comprising an armature consisting of a wheel having a rim and a central hub joined together by spokes or a solid flange, said rim being provided with slots extending to or near said spokes or flange, a series of projecting parts or arms fastened to said rim and separated by openings or slots which register with the slots in said rim, said projecting arms composed of a series of iron plates connected together, a series of coils of wire adapted to be placed into said slots so as to surround said projecting arms, a series of fields consisting of a number of plates or sheets of iron cut away at one side so as to form an opening for the armature, said field-magnets provided with a series of coils adapted to be slipped on the ends thereof, a circular frame forming part of the dynamo-frame, and having said field-magnet plates bolted thereto substantially as described.

GEORGE EDENSOR DORMAN.

Witnesses:
DONALD M. CARTER,
LILLEY H. JOHNSTONE.